United States Patent [19]
Ehrens et al.

[11] 3,817,270
[45] June 18, 1974

[54] UNIVERSAL CLAMPING DEVICE FOR TUBING OF DIFFERENT DIAMETERS

[75] Inventors: Henry Ehrens, Bayside, N.Y.; Charles W. Slocum, Spring Lakes Heights, N.J.

[73] Assignee: Sealed Unit Parts Co., Inc., Allenwood, N.J.

[22] Filed: May 26, 1972

[21] Appl. No.: 257,312

[52] U.S. Cl. .................................. 137/318, 285/197
[51] Int. Cl. ...................... B23b 41/08, F16e 41/04
[58] Field of Search ............ 137/317, 318; 285/197, 285/198, 199; 248/74 R, 221, 230

[56] References Cited
UNITED STATES PATENTS

| | | | |
|---|---|---|---|
| 3,162,211 | 12/1964 | Barusch | 137/318 |
| 3,198,206 | 8/1965 | O'Brien | 137/318 X |
| 3,252,475 | 5/1966 | Jones | 137/318 |
| 3,543,788 | 12/1970 | Mullins | 137/318 |

FOREIGN PATENTS OR APPLICATIONS
505,046  5/1939  Great Britain .................. 137/318

Primary Examiner—William R. Cline
Assistant Examiner—David R. Mathews
Attorney, Agent, or Firm—S. C. Yuter

[57] ABSTRACT

A clamp for different diameter tubing comprising an upper strap having a concave portion on the lower surface adapted to receive the tubing therein. A lower strap adapted to be fastened to the upper strap is provided whereby the upper and lower straps straddle the tubing to clamp the tubing therebetween. The lower strap is provided with means to receive tubing therein above a preselected diameter. Additionally, the lower strap is provided with upstanding supporting members which are adapted to support tubing of a preselected diameter along a horizontal center line drawn through the tubing to prevent deformation of the tubing of preselected diameter when, for example, the tubing is subjected to a piercing operation.

12 Claims, 8 Drawing Figures

PATENTED JUN 18 1974 3,817,270
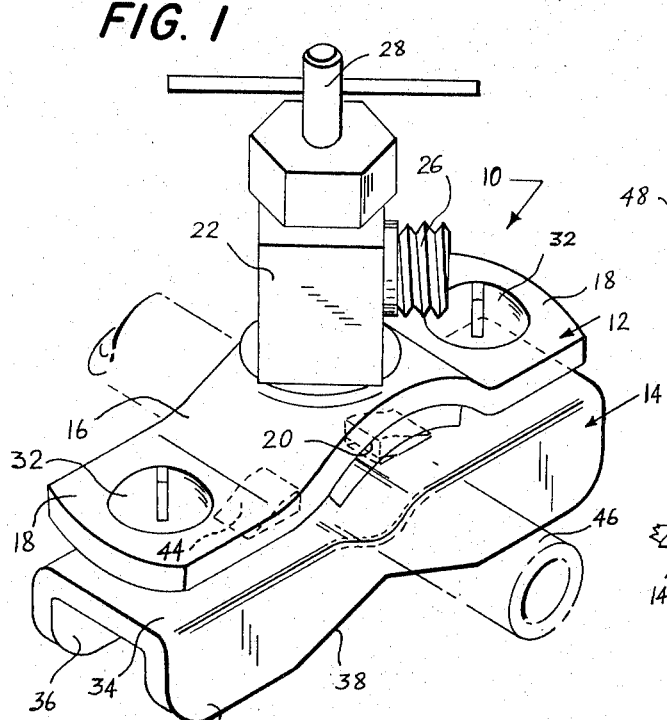
FIG. 1
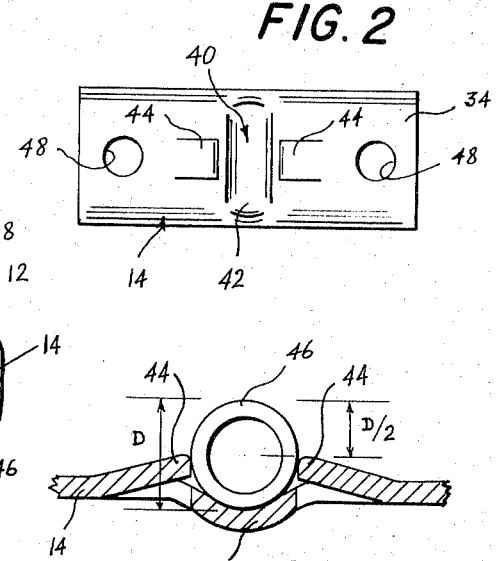
FIG. 2
FIG. 3
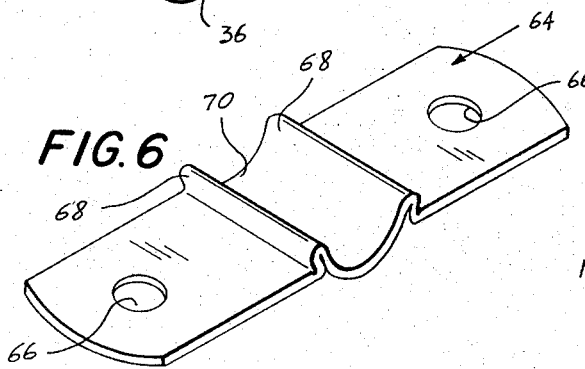
FIG. 6
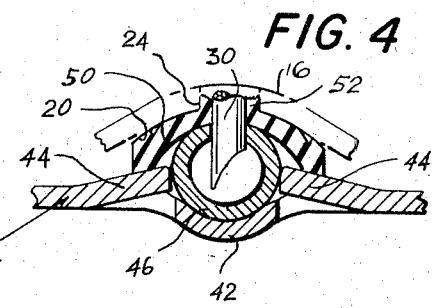
FIG. 4
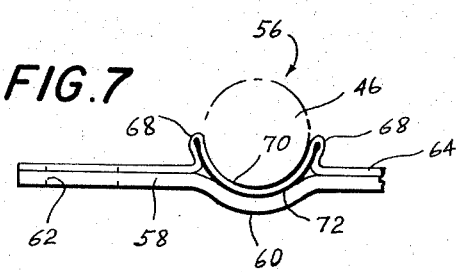
FIG. 7
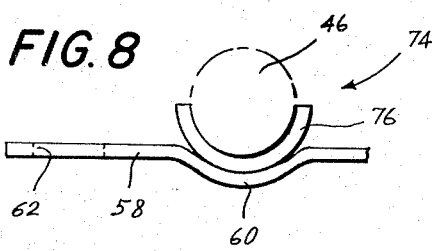
FIG. 8
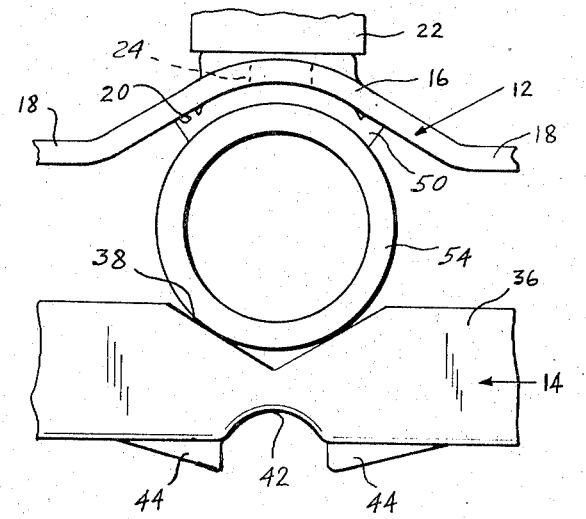
FIG. 5

UNIVERSAL CLAMPING DEVICE FOR TUBING OF DIFFERENT DIAMETERS

This invention relates generally to a clamp for tubing and, more particularly, pertains to so-called saddle clamps which can accommodate differently sized tubing.

Saddle clamps are utilized to mount a valve on an existing conduit so that a connection may be made between the valve and the conduit. Under normal circumstances a hole is drilled in the conduit prior to the mounting of the valve and the valve is then centered over the hole and is clamped in place with the saddle clamp. Recently a new type of valve such as that shown in U.S. Pat. No. 3,554,217, which issued on Jan. 12, 1971, and is assigned to the assignees of the present invention, has eliminated the need to drill a hole in the conduit by providing a piercing member within the valve body which pierces the conduit or tubing. This latter type of valve is now enjoying widespread commercial success due, in part, to the fact that it has eliminated a substantial portion of the "down" time which was required to drain and drill conduits with a consequent decrease in the cost of effecting the connection. However, in certain cases, a problem has been encountered.

To be more specific, when the conduit comprises softdrawn thin wall tubing at or below approximately three-eighths inch diameter, the piercing operation causes the tubing to deform or collapse. As a result, the fluid passage is constricted to such a degree as to decrease fluid flow to an intolerable level. Accordingly, at present a special saddle clamp is utilized in such cases which is specifically designed for use with tubing of only one diameter and is operable to support the sides of the tubing to prevent such deformation. On the other hand, when the valve is used with tubing above three-eighths inch diameter or is used on hard-drawn tubing, the deformation is minimal and no such support is required. Thus, a conventional saddle clamp may be used which usually can accommodate tubing of different diameters.

In light of the above, it becomes obvious that a mechanic is required to carry different types of saddle clamps so he will be prepared for any particular job which utilizes small and large diameter tubing. This results in a substantial increase in cost for extra and, perhaps, unnecessary equipment in addition to the extra weight that the mechanic must carry. Moreover, valves and associated clamps are supplied with devices such as humidifiers. However, the manufacturer usually only packages one type of saddle clamp with the device. Thus, the party installing the humidifier (usually the homeowner) is required to purchase another type of clamp - assuming he can locate the same.

Accordingly, an object of this invention is to provide an improved saddle clamp.

A more specific object of the present invention is to provide a single clamp which may be used with different diameter tubing.

Another object of this invention is to provide a clamp of the type described which prevents deformation of small diameter soft-drawn tubing and which is also adapted for use with large diameter tubing.

Accordingly, a clamp constructed in accordance with the present invention comprises an upper strap having a concave portion on the lower surface adapted to mate with the upper surface of the tubing. A lower strap is provided with tubing receiving means on the lower strap for receiving tubing above a preselected diameter. Support means is operatively associated with the lower strap and receives the tubing of the preselected diameter therein and is adapted to support the preselected diameter tubing over a portion of its circumference. Additionally, fastening means is provided for fastening the upper and lower straps about the tubing. Since the support means supports the tubing over a portion of its circumference, the tubing is constricted and the deformation, if any, is minimized.

In normal use, a gasket usually surrounds the connection between the tubing and the valve. However, as the valve is tightened about the tubing the gasket is compressed and may eventually flow thereby permitting the fluid to leak.

Accordingly, a feature of the present invention is to provide a clamp which will limit flow of the gasket to prevent such leakage.

Other features and advantages of the present invention will become apparent from a consideration of the following detailed description, when taken in conjunction with the accompanying drawings in which:

FIG. 1 is a perspective view of a clamp constructed in accordance with the present invention illustrating the use of the clamp on small diameter tubing;

FIG. 2 is a top plan view of the lower strap of the clamp shown in FIG. 1;

FIG. 3 is a vertical sectional view of the strap shown in FIG. 2 illustrating the positioning of the tubing thereon;

FIG. 4 is a view similar to FIG. 3 showing the cooperation between the clamp and the valve gasket during a piercing operation;

FIG. 5 is a detailed front elevational view of the clamp of FIG. 1, with parts broken away for clarity, showing the lower strap inverted to accommodate large diameter tubing;

FIG. 6 is a perspective view of an insert for the clamp shown in FIG. 7;

FIG. 7 is a front elevational view, with parts broken away, of the lower strap and insert section of a modified embodiment of a clamp constructed according to the present invention; and FIG. 8 is a front elevational view, with parts broken away, of the lower strap and insert section of a further modified embodiment of a clamp constructed in accordance with the present invention.

The clamp constructed in accordance with the present invention is designated generally by the reference numeral 10 in FIG. 1 and comprises an upper strap 12 and a lower strap 14. The upper strap 12 comprises an elongated member having a central raised arcuate portion 16 and laterally extending ears 18. The arcuate portion 16 is produced by the concave lower surface 20 of the upper strap. Centrally located on the portion 16 of the strap 12 is a valve 22 which extends through a hole 24 (FIG. 4) in the upper strap. The valve 22 is provided with a threaded outlet nipple 26 for connection to an external device.

Although the clamp 10 of the present invention is described in conjunction with the valve shown in the aforementioned patent, it is to be noted that this is for illustrative purposes only and that the clamp of the present invention may be used in conjunction with any type of valve or other element which is to be connected to tubing. However, for purposes of explanation, it will be assumed that the valve 22 takes the shape of the valve shown in the aforementioned patent. Accordingly, such valve includes an axially movable valve member 28 which is adapted to move a piercing member 30 (FIG. 4) downwardly to pierce tubing clamped between the upper and lower straps when the valve member is moved downwardly. The respective ears 18 of the upper strap 12 are provided with through holes (not shown) through which pass screws 32 which are operable to secure or fasten the upper strap to the lower strap 14 in the manner noted below.

As shown in FIG. 1, the lower strap 14 comprises a top wall 34 and depending opposed side flanges 36. Centrally located on the side flanges 36 are aligned V-slots 38 which extend upwardly from the bottom edge of the flanges and terminate below the top wall 34. The V-shaped slots 38 are adapted to receive large diameter tubing as noted in greater detail below.

Provided on the upper surface of the top wall 34 of the lower strap 14 is positioning means designated generally by the reference numeral 40(FIG. 2), which is adapted to position and support soft-drawn thin wall tubing to prevent the same from deforming during a piercing operation or the like. Since copper tubing of the type utilized for connecting humidifiers or faucets to main water lines is usually soft-drawn thin wall tubing of the type under consideration and the most used diameter tubing of this type is three-eighths inch, the invention will be described in conjunction with such tubing. However, it is to be noted that this is for illustrative purposes only and is not to be interpreted as being a limitation of the present invention since any type of tubing which is subject to extreme deformation during the piercing operation may be used in conjunction with the clamp of the present invention. More specifically, as shown in FIGS. 2–4, the positioning means 40 includes a central concave downwardly recess 42 which is adapted to be aligned with the concave lower surface 20 of the upper strap 12 when the straps are assembled on the tubing. Spaced upstanding members 44 are integral with the lower strap 14 and are positioned on either side of the recess 42, as shown in FIGS. 3 and 4. The recess 42 is provided with a radius of curvature which is substantially equal to the radius of curvature of the outside wall of the tubing which is to be supported. Additionally, the members 44 are spaced apart a distance slightly in excess of the diameter of the outer wall of the tubing so that the tubing may be inserted between the members 44 in sliding engagement therewith and rest in the recess 42.

It has been determined that minimum deformation of the tubing occurs when the lower half of the circumference of the tubing is supported. That is, deformation of the tubing is minimized when the support extends up to a horizontal line through the center of the tubing. Accordingly, as shown in FIG. 3, if the diameter of tubing such as tubing 46 is D, the support members 44 should be spaced a distance D/2 from the top of the tubing or the point at which the piercing member will enter the tubing. To put this another way, the support members support the lower half of the circumference of the tubing by extending up to a horizontal line passing through the center of the tubing. This arrangement effectively prevents the tubing from deforming outwardly and also restricts deformation at the point of piercing.

As shown in FIG. 2, the top wall 34 is also provided with through bores 48 which are adapted to be aligned with the corresponding holes in the upper strap 18 and which receive the screws therethrough when the unit is assembled.

In operation, assuming that small diameter thin wall soft-drawn copper tubing of three-eighths inch diameter is to be pierced, the lower strap 14 is positioned about the tubing 46 so that the tubing is received in the recess 42 between the members 44. It is to be noted that the members 44 facilitate positioning of the tubing and prevent lateral slippage of the same. Thereafter the upper strap 12 is positioned on the tubing and receives the upper surface of the tubing in the concave surface 20. The screws 32 are inserted through the holes in the upper strap and the holes 48 in the lower strap and appropriate nuts are threaded onto the screws. The screws are then tightened to secure the clamp in place.

At this point, it is to be noted that a gasket 50 is provided (FIG. 4), which is received in the concave portion 20 and which provides a seal between the conduit or tubing 46 and the valve 22 to prevent leakage of the fluid therebetween. The gasket 50 is provided with an upstanding boss 52 which is received in the bore or hole 24 in the upper strap 12 to maintain the gasket in position. As the screws 32 are tightened the upper strap 12 exerts a downward pressure on the gasket 50 thereby compressing the gasket 50 between the surface 20 and the upper surface of the tubing 46. Under normal circumstances, if the compression pressure is extensive, the gasket 50 will begin to flow. However, as shown in FIG. 4, the members 44 also serve to limit the flow of the gasket 50 by providing terminal points which the gasket 50 engages as the gasket is compressed.

When it is desired to effect the piercing of the tubing 46, the valve member 28 is moved downwardly to cause the piercing member 30 to pierce the tubing 46. As noted hereinabove, under normal circumstances the tubing 46 will deform to an excessive degree to render the tubing useless as a conduit for fluid. However the members 44 and the portion or recess 42 support the tubing such that deformation is minimized so that only the area adjacent the piercing member 30 is deformed thereby leaving a substantially clear passage for the flow of fluid through the tubing.

On the other hand, when it is desired to pierce large-diameter tubing such as the tubing 54 shown in FIG. 5, the lower strap 14 is turned upside-down so that V-slot 38 is uppermost. The large diameter tubing 54 is received in the slot 38 and the upper strap is placed over the tubing 54 in alignment with the lower strap, as shown in FIG. 5, so that the screws may be inserted through the upper and lower straps and secured in place. Thereafter, the piercing operation may be effected. It is to be noted that the V-slot 38 is large enough to accommodate a plurality of different diameter tubing.

Accordingly, a single saddle clamp has been described which may be utilized for large diameter tubing or, by simply reversing the lower strap, may be utilized for soft-drawn thin wall small diameter tubing and which minimizes deformation of the same. Thus, substantially full fluid flow through the tubing may be maintained.

A modified embodiment of the clamp of the present invention is shown in FIGS. 6 and 7 is designated generally by the reference numeral 56. The upper section of the clamp 56 is identical to the upper section or strap 12 of the clamp 10 and, accordingly, is not shown in FIGS. 6 and 7. The lower section of the clamp however, includes an elongated member 58 having a central concave recess 60 which is adapted to underlie the concave surface 20 of the upper strap 12. The radius of curvature of the recess 60 is sufficiently large to accommodate a plurality of different large diameter tubing. Additionally, the member 58 is provided with through bores 62 at each end which are adapted to be aligned with the holes in the upper strap 12 so that the screws 32 may be inserted therethrough when it is desired to fasten the upper and lower sections of the clamp together.

When it is desired to utilize the clamp 56 on large diameter tubing, the member 58 is positioned about the tubing with the tubing received in the recess 60. The upper strap 12 is then connected to the member 58 in the manner indicated above and the piercing operation is effected. On the other hand, when it is desired to pierce thin walled soft-drawn tubing of the type under consideration, an insert designated generally by the reference numeral 64 is provided, as shown in FIG. 6.

The insert 64 is coextensive with the member 58 and is provided with through bores 66 which are adapted to be aligned with the bores 62 so that the screws 32 may pass therethrough. The insert 64, which may be fabricated from spring steel or the like, is provided with bent walls 68 which define a concave recess 70 on the upper surface thereof. The radius of curvature of the recess 70 is substantially equal to the outside diameter of the tubing to be supported therein such as the tubing 46 indicated by the dashed lines in FIG. 7. The lower surface of the insert 64 is complementary to the recess 70 or is provided with a convex surface 72 which is received in and mates with the concave recess 60. In practice, the radius of curvature of the convex surface 72 is equal to the radius of curvature of the concave recess 60. Additionally, the walls 68 are sized so that they extend upwardly from the bottom of the recess 70 a distance which is equal to one-half of the diameter of the tubing which is to be supported as measured from the top of the tubing where the piercing is to be effected. In other words, similarly to the construction shown in FIG. 3, the walls 68 support the tubing up to a horizontal line drawn through the center of the tubing. If desired, a number of different inserts may be provided with any one upper strap and lower member so that differently sized small diameter tubing may be supported by the present invention.

FIG. 8 illustrates a further modified embodiment of a clamp which is designated generally by the reference numeral 74. The clamp 74 includes an upper section which is identical to the upper strap 12 of the clamp 10 and a lower member 58 which is identical to the member 58 of the clamp 56. However, instead of an insert 64, a semi-cylindrical insert 76 is provided. The insert 76 is provided with an outer radius of curvature which is substantially equal to the radius of curvature of the concave recess 60. Moreover, the radius of curvature of the inner wall of the recess 76 is substantially equal to the outer radius of curvature of the tubing to be supported, such as the tubing 46 indicated by the dashed lines in FIG. 8. Similarly to the insert 64 and the construction shown in FIG. 3, the walls of the insert 76 extend upwardly to a point which lies along a horizontal line passing through the center point of the tubing thereby to support the tubing and minimize the deformation of the same.

While preferred embodiments of the invention have been shown and described herein, it will become obvious that numerous omissions, changes and additions may be made in such embodiments without departing from the spirit and scope of the present invention.

What is claimed is:

1. A clamp for different diameter tubing comprising an upper strap having a concave portion on the lower surface adapted to receive the upper surface of tubing therein, a lower strap comprising opposed side flanges depending from a top wall, tubing receiving means comprising aligned recesses in said opposed side flanges of said lower strap for receiving tubing above a preselected diameter therein, tubing positioning means on the upper surface of said lower strap for receiving tubing of said preselected diameter therein, said tubing positioning means on the upper surface including support means for supporting the preselected diameter tubing over a portion of its circumference, and fastening means for fastening said upper and lower straps about the tubing.

2. A clamp as in claim 1, and valve means extending through said upper strap adapted to pierce the tubing in said clamp to provide a communicating path between the tubing and said valve means.

3. A clamp as in claim 2, and a gasket on the lower surface of said upper strap surrounding said valve means to provide a seal between said valve means and said tubing, said support means on the upper surface of said lower strap comprising raised projections on the upper surface of said lower strap adapted to engage the ends of said gasket when said clamp is fastened about said tubing to limit flow of the gasket from the lower surface of said upper strap.

4. A clamp as in claim 1, in which said support means comprises spaced raised members on said upper surface of said lower strap adapted to receive said preselected diameter tubing therebetween in sliding engagement therewith, said raised members extending above said upper surface a distance sufficient to engage said preselected diameter tubing over substantially one-half of its diameter.

5. A clamp as in claim 1, in which said tubing positioning means comprises an arcuate member on the upper surface of said lower strap, said arcuate member having an inner circumference substantially equal to one-half the circumference of the preselected diameter tubing to support the tubing over one-half of its circumference.

6. A clamp for different diameter tubing comprising an upper strap having a concave portion on the lower surface adapted to receive the upper surface of the tubing therein, a lower strap, tubing receiving means on the lower surface of said lower strap for receiving tubing above a preselected diameter therein, tubing positioning means on the upper surface of said lower strap for receiving tubing of said preselected diameter therein, said tubing positioning means on the upper surface including support means for supporting the preselected diameter tubing over a portion of its circumference, said support means comprising spaced raised members on said upper surface of said lower strap adapted to receive said preselected diameter tubing therebetween in sliding engagement therewith, said raised members extending above said upper surface a distance sufficient to engage said preselected diameter tubing over substantially one-half of its circumference, said tubing receiving means on the lower portion of said lower strap comprising opposed depending flanges, and aligned V-shaped slots in said flanges adapted to receive said tubing above said preselected diameter therein.

7. A clamp for different diameter tubing comprising an upper strap having a concave portion on the lower surface adapted to receive the upper surface of the tubing therein, a lower strap, tubing receiving means on the lower surface of said lower strap for receiving tubing above a preselected diameter therein, tubing positioning means on the upper surface of said lower strap for receiving tubing of said preselected diameter therein, said tubing positioning means on the upper surface including support means for supporting the preselected diameter tubing over a portion of its circumference, said support means comprising spaced raised members on said upper surface of said lower strap adapted to receive said preselected diameter tubing therebetween in sliding engagement therewith, said raised members extending above said upper surface a distance sufficient to engage said preselected diameter tubing over substantially one-half of its circumference, said tubing positioning means further comprising an arcuate recess in said upper surface of said lower strap, and said raised members are positioned on each side of said recess and are sized to engage the preselected diameter tubing at a point which is spaced a distance equal to substantially one-half the diameter of the tubing from the top of the tubing.

8. A clamp for different diameter tubing comprising an upper strap having a concave portion on the lower surface adapted to mate with the upper surface of the tubing, a lower strap comprising a top wall with opposed depending side flanges having aligned V-shaped slots adapted to receive tubing above a preselected diameter, support means operatively associated with the upper surface of said lower strap for receiving tubing of said preselected diameter therein and supporting the preselected diameter tubing over a portion of its circumference, and fastening means for fastening said upper and lower straps about the tubing.

9. A clamp as in claim 8, in which said support means comprises an elongated insert member adapted to seat on the upper surface of said lower strap, said insert member having a curved portion adapted to mate with an arcuate recess in the upper surface of said lower strap, and spaced upstanding walls on said insert member on each side of said curved portion, said walls being sized to extend above the upper surface of said insert member a distance sufficient to engage said preselected diameter tubing over one-half of its circumference.

10. A clamp as in claim 8, in which said support means comprises a semi-cylindrical insert adapted to mate with and be received in an arcuate recess on the upper surface of said lower strap and having an outer radius of curvature substantially equal to the radius of curvature of said recess and an inner radius of curvature equal to the radius of curvature of said preselected diameter tubing.

11. A clamp for different diameter tubing comprising an upper strap having a concave portion on the lower surface adapted to mate with the upper surface of the tubing, a lower strap, tubing receiving means projecting form the lower surface of said lower strap for receiving tubing above a preselected diameter therein, support means operatively associated with the upper surface of said lower strap for receiving tubing of said preselected diameter therein and supporting the preselected diameter tubing over a portion of its circumference, said support means comprising upstanding spaced members on the upper surface of said lower strap sized to engage the preselected diameter tubing at a point which is spaced from the top of the tubing by a distance substantially equal to one half the diameter of the tubing, and fastening means for fastening said upper and lower straps about the tubing.

12. A clamp as in claim 11, in which said members are integral with said lower strap.

* * * * *